(No Model.)
E. G. ROGERS.
IMPLEMENT FOR TIGHTENING WIRE FENCE STRANDS.
No. 507,454. Patented Oct. 24, 1893.
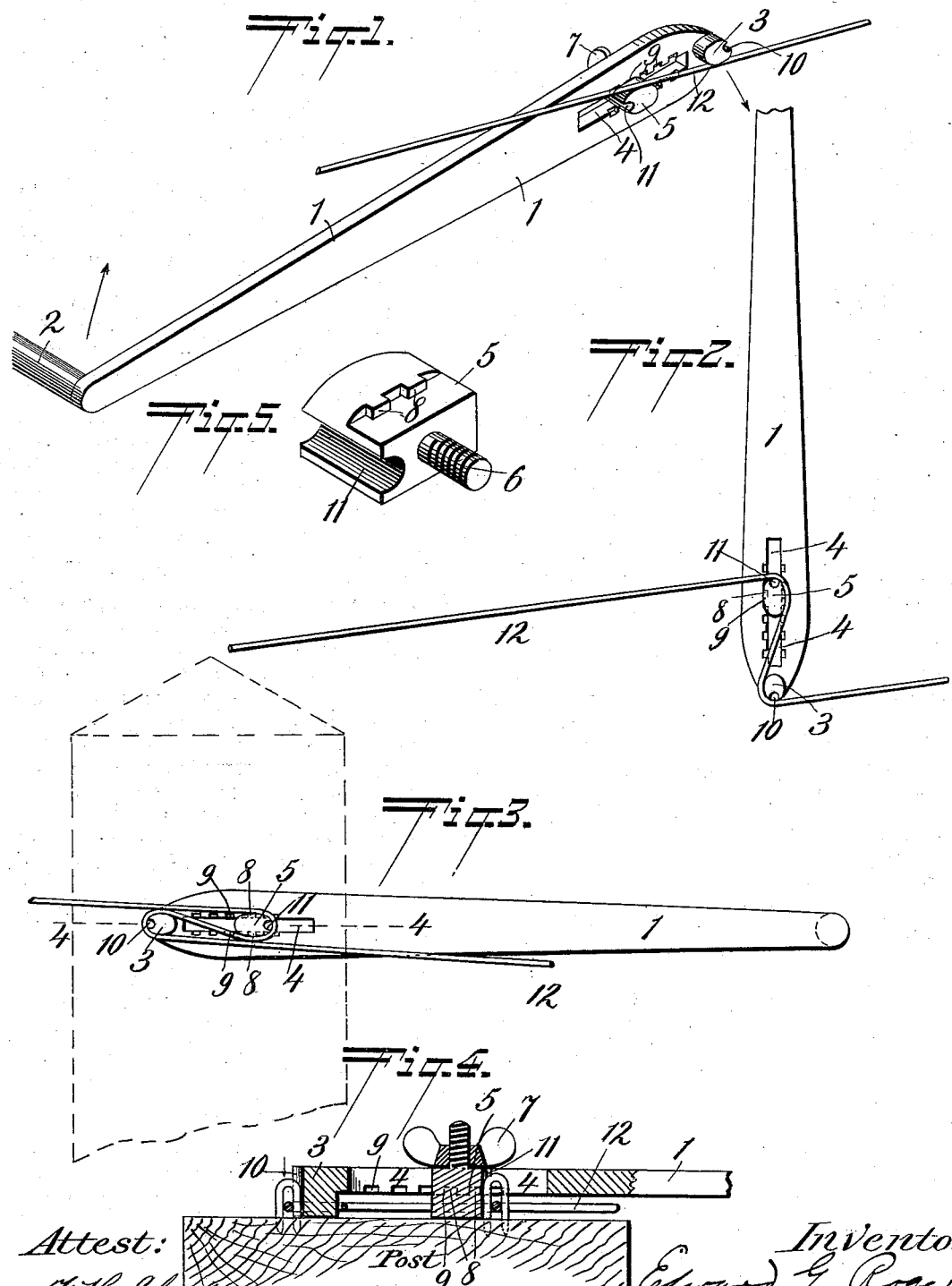
Attest:
F. H. Schott
Alfred T. Gage.
Inventor
Edward G. Rogers
by W. F. Henderson
Attorney.

UNITED STATES PATENT OFFICE.

EDWARD G. ROGERS, OF LINCOLN FALLS, PENNSYLVANIA.

IMPLEMENT FOR TIGHTENING WIRE-FENCE STRANDS.

SPECIFICATION forming part of Letters Patent No. 507,454, dated October 24, 1893.

Application filed June 19, 1893. Serial No. 478,130. (No model.)

*To all whom it may concern:*

Be it known that I, EDWARD G. ROGERS, a citizen of the United States, residing at Lincoln Falls, in the county of Sullivan and State of Pennsylvania, have invented certain new and useful Improvements in Implements for Tightening Wire-Fence Strands; and I do declare the following to be a full, clear, and exact description of the invention, such as will enable others skilled in the art to which it appertains to make and use the same, reference being had to the accompanying drawings, and to the figures and letters of reference marked thereon, which form a part of this specification.

My invention relates to an implement for taking up the slack and tightening wire fence strands, and it has for its object to provide an implement of the kind mentioned with an adjustable stud to regulate the length of the loop necessary to be formed to take up what slack may exist and to determine the tension at which the strand shall be drawn to keep it in its tightened position.

It has further for its object to improve the details of construction and combination of parts entering into the formation of the implement whereby the implement is greatly simplified and its efficiency greatly increased.

To the accomplishment of the foregoing and such other objects as may hereinafter appear, the invention consists in the construction and combination of parts hereinafter particularly described and then sought to be specifically defined by the claims, reference being had to the accompanying drawings forming a part hereof, and in which—

Figure 1 represents a perspective view of the implement with a portion of a wire strand showing the position of the parts preparatory to beginning the tightening operation. Fig. 2 represents a side view of the implement turned one quarter of a revolution to bring the wire into the position shown in that figure. Fig. 3 is a side view of the implement showing it turned around another quarter of a revolution or at a substantially horizontal plane so as to bring the wire into the position which it will bear at the time the slack is taken up and the securing staples are to be put in position, the position of the wire under such circumstances being illustrated, and the post being shown in dotted lines. Fig. 4 is a cross section on the line 4—4 of Fig. 3, and Fig. 5 represents a perspective view of the adjustable stud or block detached from the lever portion of the implement.

In the drawings the numeral 1 designates an arm or lever provided on one face preferably with a handle 2 and formed at the other end with a projecting stud 3 extending from one face of the lever. The lever at that end is also formed with an elongated slot 4 for the reception of an adjustable stud or block 5 which is represented as projecting from the same side of the lever that the stud 3 projects from. The stud 5 has projecting from one face a threaded shank 6 to receive a thumb nut 7 by means of which the stud can be clamped to any position to which it may be adjusted in the length of the elongated slot 4. In order to more effectually hold the stud 5 from slipping in any direction, tongues 8 are formed on one or opposite sides thereof which are adapted to engage with notches 9 formed in the walls of the slot 4 and by this construction it is impossible for the stud to slip. The secure holding of the stud is necessary as at times there is considerable strain on the stud in drawing up the slack in the wire and putting the proper tension on the wire. When it is desired to adjust the stud the thumb nut has merely to be loosened and the stud slipped far enough to one side to disengage the tongues from the grooves in the wall of the elongated slot and then it can be slid lengthwise and drawn back to engage the tongues with the grooves again, after which the thumb nut will be tightened and the stud will thus be securely held to its adjusted position. I prefer to make the studs 3 and 5 elongated in cross section as it is believed that a better purchase on the wire is obtained by that construction but I am not to be understood as confining myself to that detail of construction.

In order that the staples may be driven into the post after the slack is taken up so as to secure the wire strand to the post, I form grooves or ways 10 and 11 in the studs 3 and 5 respectively as clearly indicated in the several figures of the drawings. Under this construction after the slack had been taken up the staples can be made to straddle the wire and then be driven into the post so as as to hold the wire strand under the tension to which it has been brought. It is apparent that if these grooves or ways were not formed the studs would have to be moved before the staples could be driven into place and in that event the slack would be apt to run out again and the tension desired could not be obtained.

In operating the implement, it is applied as shown in Fig. 1, so as to bring the studs 3 and 5 on opposite sides of the wire strand indicated by the numeral 12. The implement is then turned and as the studs bear on opposite sides of the strand the slack is taken up, the implement being turned sufficiently to take up all the slack. Usually when the implement has been turned one half of a revolution the slack will be found to have been taken up and that being the case the staples are then caused to straddle the wire, one prong of the staples working in the grooves or ways formed in the two studs, and the staples then being driven home the wire is securely fastened to the post, the slack lying between the two staples in the form of loops as indicated in Fig. 3 of the drawings and the strand beyond those points being perfectly tight or taut. The adjustment of the stud 5 is made according as there is more or less slack to be taken up, the greater the slack to be taken up the farther apart are placed the two studs $w$ thereby forming a larger loop thus taking up the slack that may exist. When little slack exists the stud 5 is brought nearer to the stud 3, and the loop formed of the wire is consequently shorter than when more slack is to be taken up.

I have described with particularity the details of the several parts of this implement but I do not mean to confine myself to exact details of each of the parts as it is obvious that changes can be made without departing from the spirit of my invention.

The implement is not only simple in construction and therefore cheap to manufacture but being composed of few parts there is less liability of the part getting out of operative condition, and the device is exceedingly simple and easy to operate.

Having described my invention and set forth its merits, what I claim is—

1. The wire tightener composed of the lever or arm formed at one end with an elongated slot and provided with a stud projecting from the arm, and the adjustable stud working in said elongated slot and projecting from the same side of the arm or lever that the other stud projects from, substantially as and for the purposes described.

2. An implement for taking up the slack in wire fence strands comprising an arm or lever provided with a stud projecting from one face thereof and an adjustable stud adapted to be moved to and from the other stud, both studs being formed with ways or grooves for the reception of the tongues of a wire staple, substantially as and for the purposes described.

3. An implement for tightening wire fence strands comprising an arm or lever provided with a stud projecting from the face thereof and an adjustable stud working in an elongated slot formed in the arm or lever and provided with a tongue to engage a groove formed in the wall of said slot, substantially as and for the purposes described.

4. An implement for tightening wire fence strands comprising an arm or lever formed with a stud projecting from one face thereof and having an elongated slot, an adjustable stud working in said slot and projecting from the face of the arm or lever and formed with a threaded shank, and a thumb nut engaging with said shank and adapted to bind the stud to the arm or lever, substantially as and for the purposes described.

In testimony whereof I affix my signature in presence of two witnesses.

EDWARD G. ROGERS.

Witnesses:
J. W. ROGERS,
A. V. ROGERS.